US006426389B2

(12) United States Patent
Coe

(10) Patent No.: US 6,426,389 B2
(45) Date of Patent: Jul. 30, 2002

(54) FUNCTIONALIZED POLYPROPYLENES AND PROCESS FOR PRODUCTION

(75) Inventor: Stephen Wayne Coe, Longview, TX (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/774,860

(22) Filed: Jan. 31, 2001

Related U.S. Application Data

(62) Division of application No. 09/261,720, filed on Mar. 3, 1999, now Pat. No. 6,218,476.

(51) Int. Cl.[7] .............................................. C08F 255/02
(52) U.S. Cl. ..................... 525/285; 525/322; 525/333.7
(58) Field of Search ................. 525/285, 322, 525/33.7

(56) References Cited

U.S. PATENT DOCUMENTS

| 4,376,855 A | | 3/1983 | Ames |
| 4,578,428 A | | 3/1986 | Clemential et al. |
| 4,857,600 A | | 8/1989 | Gross et al. |
| 5,140,074 A | | 8/1992 | DeNicola, Jr. et al. |
| 5,266,643 A | | 11/1993 | Mustonen et al. |
| 5,539,057 A | | 7/1996 | Giroux |
| 5,955,547 A | * | 9/1999 | Roberts et al. ............. 525/285 |

* cited by examiner

*Primary Examiner*—James J. Seidleck
*Assistant Examiner*—Olga Asinovsky
(74) *Attorney, Agent, or Firm*—B. J. Boshears; Bernie J. Graves, Jr.

(57) ABSTRACT

A novel process for preparing functionalized polypropylenes entailing apportioned introduction of free radical initiator is described. Also described are novel functionalized polypropylenes having a yellowness index color of at least 77 and a Brookfield Thermosel viscosity of greater than 7000 cP at 190° C. Preferably, the functionalized polypropylenes are further characterized by having an acid number greater than 6 milligrams of KOH per gram of polymer.

17 Claims, No Drawings

FUNCTIONALIZED POLYPROPYLENES AND PROCESS FOR PRODUCTION

This application is a divisional of U.S. application Ser. No. 09/261,720, filed Mar. 3, 1999, now U.S. Pat. No. 6,218,476.

FIELD OF THE INVENTION

This invention relates to novel functionalized polypropylenes having a unique combination of viscosity and yellowness index properties. This invention also relates to a novel polypropylene functionalization process.

BACKGROUND OF THE INVENTION

Grafting of monomers onto polyolefins is well known (see 'Polymer Chemistry' by M. P. Stevens, (Addison-Wesley), 1975, pp. 196–202). Maleation for example, is a type of grafting wherein maleic anhydride is grafted onto the backbone chain of a polymer. Maleation of polyolefins falls into at least three subgroups: maleation of polyethylene, maleation of polypropylene, and maleation of copolymers of propylene and ethylene or other monomers.

Maleation of polyethylene provides higher molecular weight products with a noticeable decrease in melt index due to cross-linking, unless special provisions are made, (see for example "Journal of Applied Polymer Science", 44, 1941, N. G. Gaylord et al (1992); and U.S. Pat. Nos. 4,026,967; 4,028,436; 4,031,062; 4,071,494; 4,218,263; 4,315,863; 4,347,341; 4,358,564; 4,376,855; 4,506,056; 4,632,962; 4,780,228; 4,987,190; and 5,021,510). Maleation of polypropylene follows an opposite trend and yields lower molecular weight products with a sharp increase in flow rate due to fragmentation during the maleation process (see for example U.S. Pat. Nos. 3,480,580; 3,481,910; 3,642,722; 3,862,265; 3,932,368; 4,003,874; 4,548,993; and 4,613,679). Some references in the literature fail to note the difference between maleation of polyethylene and polyproplyene, and claim maleation of polyolefins with conditions which are useful only for either polyethylene or polypropylene, respectively. In general, conditions which maleate polypropylene are not ideal for maleation of polyethylene due to the opposite nature of the respective maleation chemistries: fragmentation to lower molecular weights for polypropylene and cross-linking to higher molecular weights for polyethylene. This is shown in U.S. Pat. No. 4,404,312. Maleation of copolymers of propylene and ethylene or other monomers follow the pattern of the majority component.

Maleations of polypropylene can also be further subdivided into batch or continuous processes. In batch processes generally all of the reactants and products are maintained in the reaction for the entire batch preparation time. In general, batch maleation processes are difficult to use competitively in commerce due to high cost. Batch processes are inherently more expensive due to startup and cleanup costs.

The maleated polypropylenes that are reported in the previous literature can also be divided into two product types as a function of whether or not solvent is involved, either as a solvent during reaction or in workup of the maleated products. In U.S. Pat. Nos. 4,506,056; and 5,001,197 the workup of the product involved dissolving the maleated polypropylene product in a solvent followed by precipitation, or washing with a solvent. This treatment removes soluble components and thus varies both the 'apparent' molecular weight and the acid number. Processes using an extruder produce a product in which solvent soluble components remain. In addition, extruder processes often incorporate a vacuum system during the latter stages of the process to remove volatile lower molecular weight components. Thus, different compositions are necessarily present in products produced in an extruder in contrast to those products from solvent processes or those which use a solvent in product workup.

Another subdivision of maleation of polyolefins concerns the state of the reaction process. Solvent processes, or processes where solvent is added to swell the polypropylene (see U.S. Pat. No. 4,370,450), are often carried out at lower temperatures than molten polyolefin (solvent free) processes. Such processes involve surface maleation only, with substantial amounts of polypropylene below the surface being maleation free. Processes using molten polypropylene involve random maleation of all of the polypropylene. Solvent processes are also more expensive in that solvent recovery/purification is necessary. Solvent purification is even more expensive if the process inherently produces volatile by-products, as in maleation. Note that if water is the 'solvent' polypropylene is not soluble and reaction must occur only on the surface of the polypropylene solid phase. Further, in aqueous processes maleic anhydride reacts with the water to become maleic acid. In these two ways processes containing water are necessarily different from non-aqueous processes. In a molten process no solvent or water remains at the end of the process to be purified or re-used. Thus a molten process would be environmentally 'greener' and less expensive.

SUMMARY OF THE INVENTION

The composition according to the present invention comprises a functionalized polypropylene having a yellowness index color of at least 77, and a Brookfield Thermosel viscosity of greater than 7000 cP at 190° C. Preferably, the functionalized polypropylene is further characterized by having an acid number greater than 6 milligrams of KOH per gram of polymer The novel process according to the present invention for the production of functionalized polypropylenes, including the novel functionalized polypropylenes of the present invention, is comprised as follows. A polypropylene is introduced into an apparatus, either in premolten form or as solid particulates (for example, pellets or powder) which are then melted; into the molten polypropylene is introduced a portion of the required amount of a free radical initiator, and the molten polypropylene and free radical initiator are mixed; into the resultant mixture is then introduced the entire amount of a functionalizing agent which is mixed therewith such that the functionalizing agent, the initial portion of initiator and the polypropylene are reacted; into the resultant reaction mixture is then introduced the remainder of the required amount of the free radical initiator to thereby form the desired functionalized polypropylene; and recovering the resultant functionalized polypropylene.

The remaining portion of the free radical initiator added after the functionalizing agent addition may be carried out in a plurality of zones. In each case the portion of the remaining free radical initiator added is mixed to form an intermediate reaction product into which additional free radical initiator is added. The percent of the remaining free radical initiator that may be added in each of the plurality of zones is between 1% and 99% by weight of the remaining free radical initiator added after the functionalizing agent addition. Preferably, the number of additional free radical initiator injection zones is between 2 and 10.

The polypropylene utilized herein has a melt flow rate of preferably about 0.1 to about 50 at 230° C. Moreover, the process described herein may be practiced in a continuous or batch manner.

DETAILED DESCRIPTION OF THE INVENTION

The applicant has unexpectedly discovered a novel batch or continuous process to functionalize polypropylenes. The process may be used to prepare a wide variety of functionalized polypropylenes, some of which are novel functionalized polypropylenes.

The novel functionalized polypropylenes according to the present invention have a yellowness index color of at least 77. The yellowness index color analysis is illustrated in the examples. The functionalized polypropylenes according to the present invention preferably have a yellowness index color ranging from at least 77 to about 200, more preferably from at least 77 to about 150, with a yellowness index color from at least 77 to about 120 being most preferred. A still further preferred yellowness index color ranges from 81 to about 120.

The functionalized polypropylene of the present invention has a Brookfield Thermosel viscosity of at least 7,000 cP at 190° C. The Brookfield Thermosel viscosity is preferably at least 7,000 to about 100,000 cP at 190° C., with a Brookfield Thermosel viscosity at 190° C. of about 16,000 to about 80,000 cP being most preferred.

The novel functionalized polypropylenes according to the present invention are further characterized by preferably having an acid number greater than 6 milligrams of KOH per gram of polymer (the method of determining acid number is illustrated in the examples). The functionalized polypropylenes according to the present invention more preferably have an acid number ranging from greater than 6 milligrams of KOH per gram of polymer to about 280 milligrams of KOH per gram of polymer, more preferably greater than 6 milligrams of KOH per gram of polymer to about 100 milligrams of KOH per gram of polymer, with an acid number of from greater than 6 milligrams of KOH per gram of polymer to about 70 milligrams of KOH per gram of polymer being most preferred. Generally, at higher acid numbers the resulting functionalized polypropylene exhibits higher adhesiveness to polar substrates and thus is more useful in combination with materials used in adhesives and sealants. Additionally, at higher acid numbers the functionalized polypropylene is useful as a compatibilizing agent or coupler when used in blends of dissimilar materials, including polymer blends such as a nylon and polypropylene blend. At higher acid numbers lower amounts of functionalized polypropylene are generally needed for any of these purposes.

The functionalized polypropylenes herein are made from a polypropylene that contains less than 20 weight percent of a comonomer. The comonomer can be any hydrocarbon monomer containing from 2 to 10 carbon atoms that can be copolymerized with propylene. Particularly useful is ethylene comonomer.

The functionalized polypropylene herein can be blended with many other materials to serve as a compatibilizer, such as in blends with wood and polypropylene. This type of blend typically contains about 30 weight percent wood, about 67 weight percent polypropylene, and about 3 weight percent functionalized polypropylene.

Additionally, the functionalized polypropylene of the present invention is also useful to compatibilize other polar materials with the non-polar polyolefin, especially polypropylene. Examples of other polar materials include glass fibers, talc, mica and wollastonite.

The novel process according to the present invention for producing functionalized polypropylenes comprises:

(a) introducing a polypropylene either in molten form or solid particulate form (e.g. powder or pellets) into an apparatus and melting the polypropylene if required to do so, at a temperature above the melting point of the polypropylene, preferably at a temperature of from above the melting point to about 230° C., and most preferably at a temperature of from above the melting point of the polypropylene to about 200° C., (b) introducing into the molten polypropylene an amount of from about 0.01 to about 99.99% by weight, preferably an amount of about 5 to less than 50% by weight, of the required amount of a free radical initiator, and mixing the free radical initiator with the polypropylene, (c) introducing into the resultant mixture of polypropylene and free radical initiator the entire required amount of functionalizing agent, preferably at a time of about 5 to about 180 seconds following introduction of the initital portion of free radical initiator, and mixing the functionalizing agent with the mixture of polypropylene and initiator such that the functionalizing agent, the initial portion of the initiator and polypropylene are reacted to form a reaction mixture, (d) introducing into the resultant reaction mixture the remaining amount of from about 99.99 to about 0.01% by weight, preferably an amount in excess of 50% to about 95% by weight, of the free radical initiator, preferably at a time of about 5 to about 240 seconds after the introduction of functionalizing agent into the mixture of polypropylene and initial portion of initiator, and mixing the remaining amount of initiator with the previously formed reaction mixture in order to form the desired functionalized polypropylene, and (e) recovering the resultant functionalized polypropylene.

If desired, the remaining portion of the free radical initiator added after the functionalizing agent addition may be carried out in a plurality of zones. In each case the portion of the remaining free radical initiator added is mixed to form an intermediate reaction product into which additional free radical initiator is added The percent of the remaining free radical initiator that may be added in each of the plurality of zones is between 1% and 99% by weight of the remaining free radical initiator added after the functionalizing agent addition. Preferably, the number of additional free radical initiator injection zones is between 2 and 10.

The process according to the present invention functionalizes a polypropylene.

The process according to the present invention uses a free radical initiator to initiate the grafting of the functionalizing agent onto the molten polypropylene. Any free radical source can be used in the process of the present invention. However, peroxides are generally more preferred. In the process according to the present invention, the same or different free radical initiators can be used in either introduction point. The preferred peroxides are alkyl peroxides, more preferably dialkyl peroxides. Examples of suitable peroxides useful in the process of the present invention include ditertiary butyl peroxide, tertiary butyl hydroperoxide, cumene hydroperoxide, p-menthane peroxide, p-menthane hydroperoxide and 2,5-dimethyl-2,5-di (t-butylperoxy) hexane with ditertiary butyl peroxide and 2,5-dimethyl-2,5-di (t-butylperoxy) hexane being most preferred. Other examples of peroxides suitable for use herein are tertiary butyl cumyl peroxide, dicumyl peroxide, acetyl peroxide, propionyl peroxide, benzoyl peroxide, tertiary butyl peroxy laurate, and tertiary butyl peroxy benzoate. Mixtures of peroxides are suitable for use in the present process.

The functionalizing agent utilized in the present invention may be any unsaturated monomer containing one or more carboxylic acid or acid anhydride groups, that can functionalize a polypropylene as defined herein. Examples of suitable functionalizing agents herein are carboxylic acids such as acrylic and methacrylic acid, and acid anhydrides such as maleic anhydride. Further exemplary functionalizing agents suitable for use herein are unsaturated monocarboxylic acids and polycarboxylic acids and cyclic acid anhydrides. Specifically included herein are acids such as maleic acid, fumaric acid, himic acid, itaconic acid, citraconic acid, mesaconic acid, acrylic acid, methacrylic acid, crotonic acid, isocrotonic acid, and acid anhydrides such as maleic anhydride and himic anhydride. Preferred for use herein as the functionalizing agent in the functionalization of the polypropylene is maleic anhydride. Mixtures of functionalizing agents may be utilized in the present invention.

The process according to the present invention is conducted in a continuous or batch process. Any continuous process can be used in the practice of the present invention. However, stirred pot reactors with powerful stirring mechanisms or screw extruders are favored, with screw extruders generally being more preferred. Twin-screw extruders are the most preferred screw extruders due to their ease of use and efficient mixing action. Screw extruders are also more preferred in that the polypropylene is functionalized continuously with a shorter residence time in the reaction zones. The use of a screw extruder in the process of the present invention aids in the production of functionalized polypropylenes.

The process according to the present invention is preferably conducted at a weight ratio of polypropylene to functionalizing agent of about 1 to about 400, more preferably from about 2 to about 50, even more preferably from about 2 to about 20.

The residence time of the polypropylene in a continuous reactor depends upon the pumping rate of the polypropylene and the size (volume) of the reactor. This time is generally longer than three times the half life of the free radical initiator so that a second pass through the reactor is not needed to obtain sufficient functionalization of the polypropylene. In a stirred reactor the residence time generally varies from about 5 minutes to 1 hour, more preferably about 10 minutes to 30 minutes. In a twin screw extruder this time generally varies from about 0.45 to 5 minutes, more preferably about 1 to 3.5 minutes at screw speeds of 100 to 1500 revolutions per minute (rpm).

The molar ratio of polypropylene to free radical initiator used in the functionalization process according to the present invention in step (b), is preferably about 200 to 3500, and in step (d) is preferably a molar ratio of about 50 to 300.

The process according to the present invention is conducted at a temperature above the melting point of the polypropylene. This temperature is preferably from above the melting point to about 230° C., more preferably at a temperature from above the melting point of the polypropylene to about 200° C.

The process according to the present invention is generally conducted such that a vacuum is used after step (d) to remove volatiles from the functionalized polypropylene.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLES

In the following examples the test procedures listed below were used in evaluating the analytical properties of the functionalized polypropylenes herein.

Acid Number—acid number was determined in accordance with ASTM D1386-83 with the following modifications: A 0.05 N sodium hydroxide (NaOH) in methanol solution was substituted for the 0.1 N aqueous solution of potassium hydroxide in ethanol and the sample size was increased from 1–2 grams to 5 grams, and the weighing accuracy was changed from 0.001 to 0.0001 grams.

Color—color was measured as "yellowness index" in accordance with ASTM E313-73.

Viscosity is determined in accordance with ASTM D-3236 utilizing a Brookfield Model RVDV-II+ digital Viscometer with a SC 4-27 spindle and a Brookfield Model 74R Temperature Controller set to 190° C., with the following exceptions:

a. viscosity was recorded 20 minutes after beginning spindle rotation in the sample;

b. only single measurements were taken for each sample; and c. the rotational speed was 3 rpm.

The units are expressed as centipoise (cP).

EXAMPLE 1

Pellets of Huntsman P4-026 polypropylene homopolymer having a melt flow rate of 1 g/10 min were fed into the inlet hopper of a Berstorff ZE 40 A×55 L/D corotating twin screw extruder. Pellets were fed with a volumetric pellet feeder. The extruder temperature was maintained at about 200° C. The polypropylene pellets were introduced at a rate of about 73 pound/hour (33.1 kg/hour). The extruder RPM was about 200. The initial portion of free radical initiator (2,5-dimethyl-2,5-di(t-butylperoxy)hexane) was injected into the molten polypropylene at a rate of about 0.16 pound/hour (0.07 kg/hour), 5% by weight of total initiator, and mixed with the molten polypropylene. Molten maleic anhydride was thereafter introduced into the mixture of molten polypropylene and initial portion of initiator at a rate of about 14.4 pound/hour (6.5 kg/hour). The molten maleic anhydride was then mixed with the mixture of molten polypropylene and initial portion of initiator such that a reaction mixture was formed. Into the resulting reaction mixture there was introduced 2,5-dimethyl-2,5-di(t-butylperoxy) hexane initiator at a rate of about 3 pound/hour (1.4 kg/hour), 95% by weight of the total initiator. The resultant mixture was mixed such that the desired maleated polypropylene was formed. Two zones of vacuum venting were used to remove volatiles, the first having 24 inches of mercury and the second having 27 inches of mercury. The product was recovered by extruding the molten product into a standard cold water stranding bath. The cooled strands were subsequently chopped into pellets. The product was analyzed and found to have the following properties: acid number of about 33.2 milligram of KOH per gram of polymer; Brookfield Thermosel viscosity at 190° C. of about 27,000 cP; and a yellowness index color of 77.

Example 2

Pellets of Huntsman P5-012 random copolymer of polypropylene containing 3 weight percent ethylene having a melt flow rate of 1.9 g/10 min were fed into the inlet hopper of a Berstorff ZE 40 A×55 L/D corotating twin screw extruder. Pellets were fed with a volumetric pellet feeder. The extruder temperature was maintained at about 177° C. The polypropylene pellets were introduced at a rate of about 65 pound/hour (29.5 kg/hour). The extruder RPM was about 300. The initial portion of free radical initiator (2,5-dimethyl-2,5-di(t-butylperoxy)hexane) was injected into the molten polypropylene at a rate of about 1.5 pound/hour (0.68 kg/hour), 43% by weight of total initiator, and mixed with the molten polypropylene. Molten maleic anhydride was thereafter introduced into the mixture of molten polypropylene and initial portion of initiator at a rate of about 14.4 pound/hour (6.5 kg/hour). The molten maleic anhydride was then mixed with the mixture of molten polypropylene and initial portion of initiator such that a reaction mixture was formed. Into the resulting reaction mixture there was introduced 2,5-dimethyl-2,5-di(t-butylperoxy) hexane initiator at a rate of about 2 pound/hour (0.9 kg/hour), 57% by weight of the total initiator. The resultant mixture was mixed such that the desired maleated polypropylene was formed. Two zones of vacuum venting were used to remove volatiles, the first having 26.5 inches of mercury and the second also having 26.5 inches of mercury. The product was recovered by extruding the molten product into a standard cold water stranding bath. The cooled strands were subsequently chopped into pellets. The product was analyzed and found to have the following properties: acid number of about 35.6 milligram of KOH per gram of polymer; Brookfield Thermosel viscosity at 190° C. of about 25,000 cP; and a yellowness index color of 105.6.

Example 3

Pellets of Huntsman P5-012 random copolymer of polypropylene containing 3 weight percent ethylene having a melt flow rate of 1.9 g/10 min were fed into the inlet hopper of a Berstorff ZE 40 A×55 L/D corotating twin screw extruder. Pellets were fed with a volumetric pellet feeder. The extruder temperature was maintained at about 177° C. The polypropylene pellets were introduced at a rate of about 65 pound/hour (29.5 kg/hour). The extruder RPM was about 250. The initial portion of free radical initiator (2,5-dimethyl-2,5-di(t-butylperoxy)hexane) was injected into the molten polypropylene at a rate of about 1.4 pound/hour (0.6 kg/hour), 22% by weight of total initiator, and mixed with the molten polypropylene. Molten maleic anhydride was thereafter introduced into the mixture of molten polypropylene and initial portion of initiator at a rate of about 20.6 pound/hour (9.3 kg/hour). The molten maleic anhydride was then mixed with the mixture of molten polypropylene and initial portion of initiator such that a reaction mixture was formed. Into the resulting reaction mixture there was introduced 2,5-dimethyl-2,5-di(t-butylperoxy) hexane at a rate of about 5 pound/hour (2.3 kg/hour), 78% by weight of the total initiator. The resultant mixture was mixed such that the desired maleated polypropylene was formed. Two zones of vacuum venting were used to remove volatiles, the first having 22.5 inches of mercury and the second having 27.5 inches of mercury. The product was recovered by extruding the molten product into a standard cold water stranding bath. The cooled strands were subsequently chopped into pellets. The product was analyzed and found to have the following properties: acid number of about 47.2 milligram of KOH per gram of polymer; Brookfield Thermosel viscosity at 190° C. of about 27,000 cP; and a yellowness index color of 104.4.

It should be clearly understood that the forms of the invention herein described are illustrative only and are not intended to limit the scope of the invention. The present invention includes all modifications falling within the scope of the following claims.

I claim:

1. A functionalized polypropylene comprising a polypropylene functionalized with an unsaturated monomer containing one or more carboxylic acid or acid anhydride groups, having a yellowness Index color of at least 80 and a Brookfield Thermosel viscosity of greater than 7000 cP at 190° C.

2. The functionalized polypropylene according to claim 1 wherein the functionalized polypropylene is further characterized by having an acid number greater than 6 milligrams of KOH per gram of polymer.

3. The functionalized polypropylene according to claim 2 wherein the acid number is from greater than 6 milligrams of KOH per gram of polymer to about 280 milligrams of KOH per gram of polymer.

4. The functionalized polypropylene of claim 3 wherein the acid number is from greater than 6 milligrams of KOH per gram of polymer to about 100 milligrams of KOH per gram of polymer.

5. The functionalized polypropylene of claim 4 wherein the acid number is from greater than 6 milligrams of KOH per gram of polymer to about 75 milligrams of KOH per gram of polymer.

6. The functionalized polypropylene of claim 1 wherein the yellowness index color is from at least 80 to about 200.

7. The functionalized polypropylene of claim 6 wherein the yellowness index color is from at least 80 to about 150.

8. The functionalized polypropylene of claim 7 wherein the yellowness index color is from at 80 to about 120.

9. The functionalized polypropylene of claim 8 wherein the yellowness index color is from 81 to about 120.

10. The functionalized polypropylene of claim 1 wherein the Brookfield Thermosel viscosity is from greater than 7000 to about 100,000 cP at 190° C.

11. The functionalized polypropylene of claim 10 wherein the Brookfield Thermosel viscosity is from about 16,000 to about 80,000 cP at 190° C.

12. The functionalized polypropylene of claim 2 wherein the acid number is from greater than 6 milligrams of KOH per gram of polymer to about 75 milligrams of KOH per gram of polymer, the yellowness index color is from 81 to about 120, and the Brookfield Thermosel viscosity is from about 16,000 to about 80,000 cP at 190° C.

13. The functionalized polypropylene of claim 1 wherein the polypropylene of the functionalized polypropylene is a homopolymer of propylene.

14. The functionalized polypropylene of claim 1 wherein the polypropylene of the functionalized polypropylene contains less than 20 weight percent of a comonomer.

15. The functionalized polypropylene of claim 14 wherein the comonomer is ethylene.

16. The functionalized polypropylene of claim 1 wherein the unsaturated monomer contains one or more acid anhydride groups.

17. The functionalized polypropylene of claim 16 wherein the unsaturated monomer is maleic anhydride.

* * * * *